United States Patent
Korkin et al.

(10) Patent No.: US 8,742,329 B2
(45) Date of Patent: Jun. 3, 2014

(54) WELL FLAW DETECTION SYSTEM (EMBODIMENTS)

(75) Inventors: Roman Vladimirovich Korkin, Berdsk (RU); Viacheslav Viktorovich Porosev, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 232 days.

(21) Appl. No.: 12/997,279

(22) PCT Filed: Jun. 11, 2008

(86) PCT No.: PCT/RU2008/000373
§ 371 (c)(1),
(2), (4) Date: Mar. 24, 2011

(87) PCT Pub. No.: WO2009/151350
PCT Pub. Date: Dec. 17, 2009

(65) Prior Publication Data
US 2011/0284732 A1 Nov. 24, 2011

(51) Int. Cl.
*G01V 5/12* (2006.01)
(52) U.S. Cl.
USPC ............... 250/266; 250/269.1; 250/269.3; 250/269.2; 250/265
(58) Field of Classification Search
USPC ............ 250/266, 269.1, 269.3, 269.2, 265
See application file for complete search history.

(56) References Cited

U.S. PATENT DOCUMENTS

| | | | |
|---|---|---|---|
| 2,524,208 A | 10/1950 | Piper | |
| 4,129,777 A | 12/1978 | Wahl et al. | |
| 4,297,575 A * | 10/1981 | Smith et al. | 250/265 |
| 4,510,447 A | 4/1985 | Moyer | |
| 4,739,273 A | 4/1988 | Petersen et al. | |
| 4,870,669 A | 9/1989 | Anghaie et al. | |
| 4,880,983 A * | 11/1989 | Markey | 250/385.1 |
| 5,451,779 A * | 9/1995 | Spross et al. | 250/266 |
| 5,521,956 A | 5/1996 | Charpak | |
| 5,525,797 A * | 6/1996 | Moake | 250/269.3 |
| 5,578,820 A * | 11/1996 | Gadeken et al. | 250/256 |
| 6,359,446 B1 | 3/2002 | Little, Jr. | |
| 6,452,191 B1 * | 9/2002 | Johnson et al. | 250/385.1 |
| 6,486,468 B1 * | 11/2002 | Lacy | 250/282 |
| 6,653,847 B2 | 11/2003 | Little, Jr. | |
| 6,738,720 B2 * | 5/2004 | Odom et al. | 702/78 |
| 6,772,637 B2 | 8/2004 | Bazarov et al. | |
| 6,924,640 B2 | 8/2005 | Fickert et al. | |

(Continued)

FOREIGN PATENT DOCUMENTS

| | | |
|---|---|---|
| RU | 2145096 C1 | 1/2000 |
| RU | 2147138 | 3/2003 |
| RU | 2262720 | 10/2005 |
| RU | 2305766 C1 | 9/2007 |

OTHER PUBLICATIONS

E.V. Semenov, T.E.Krutova, R.R. Galeev, A.M. Islamov, Gamma-gamma scanners for the cased wells investigation, Karotazhnik, vol. 10-11, pp. 66-73, 2005.

(Continued)

*Primary Examiner* — Christine Sung
(74) *Attorney, Agent, or Firm* — Jeremy Berman (57) ABSTRACT

This invention relates to nondestructive control, more specifically, to the detection of cracks, flaws and other defects in oil and gas wells and cementing quality control.

12 Claims, 7 Drawing Sheets

(56) References Cited

U.S. PATENT DOCUMENTS

| | | |
|---|---|---|
| 7,777,499 B2 | 8/2010 | Little, Jr. |
| 7,858,949 B2 * | 12/2010 | Bolotnikov et al. ....... 250/385.1 |
| 7,874,212 B2 | 1/2011 | Yamano |
| 7,960,969 B2 | 6/2011 | Mouget et al. |
| 8,035,400 B2 | 10/2011 | Little, Jr. |
| 2004/0256101 A1 * | 12/2004 | Fox et al. .................... 166/252.5 |
| 2007/0119243 A1 * | 5/2007 | Smits et al. ................. 73/152.14 |
| 2007/0284518 A1 * | 12/2007 | Randall ......................... 250/261 |
| 2011/0284732 A1 | 11/2011 | Korkin et al. |
| 2012/0060609 A1 | 3/2012 | Fukutomi et al. |

OTHER PUBLICATIONS

International Search Report for the equivalent PCT patent application number of PCT/RU2008/000373 dated Mar. 12, 2009.

Yu M. Zavorotko, "Geofizicheskie metody issledovaniya skvazhin," Moskva, Nedra, 1983, pp. 165-166. (Abstract Only).

Naiti vydelennoe, "Geofizicheskie metody issledovaniya zemnoi kory," printed Jan. 8, 2014, http://www.astronet.ru:8105/db/msg/1173309/page62.html, 4 pages. (Abstract Only).

* cited by examiner

WELL FLAW DETECTION SYSTEM (EMBODIMENTS)

PRIOR ART

The detection of cracks, flaws and other defects in oil and gas wells using nondestructive control methods is an ultimate importance task. Timely detection of corrosion, erosion, cracks and other defects of the casing string allows avoiding long downtime periods of production wells. On the other hand, low time consuming well repairs largely increase well service life. Another important task of nondestructive well control is cementing quality control. Flaws and cavities in the cement due to low quality cementing may cause water cut increasing in the produced fluid because water may transfer between formations through holes in the cement.

There are various methods and devices for flaw detection in cased wells and for cement quality control. These devices can be divided into the following categories: electromagnetic devices, sonic and ultrasonic acoustic logging devices and radiographic devices.

Electromagnetic devices use multiple electromagnetic coils some of which act as emitters and the others as receivers. The emitters generate an alternating magnetic field of several Hertz to several kilohertz. The magnetic field induces electric currents in the casing string that generate a secondary magnetic field, and that latter field can be measured by the receivers. Example of an electromagnetic device is the EMIT (Electromagnetic Imaging Tool) developed by Schlumberger. The use of the electromagnetic devices for this method requires the relative magnetic permittivity be known. Obviously, such devices are not suitable for nonconductive materials and hence for cement quality control. Moreover, these devices do not provide flaw location data if the well has multiple casing strings.

Acoustic logging devices comprise one emitter and, as a rule, two receivers. In a cemented casing, signal attenuation is proportional to the bond surface area between the cement and the casing. The signal amplitude is used for cement quality control. Microscopic flaws or cavities in the hardened cement increase the signal amplitude. However, device centering is a very important factor in this method. Inaccurate device centering causes phase shift between signals. Example of an acoustic logging device is the CBL (Cementing Bond Logging) developed by Schlumberger.

In ultrasonic devices, an emitter sends short pulses to the casing string, and the same emitter is used as the receiver. Signal pass time, resonance frequency and resonance signal waveform are used for measuring the internal diameter, thickness and acoustic impedance of the casing string. If the cement is hard and has a good bond to the casing string, the acoustic impedance of the system is higher compared to the fluid containing cement. If the cement to casing string bond is poor and the cavities and cracks contain fluid, the acoustic impedance depends on the properties of the fluid. If the fluid is gaseous, the energy transfer coefficient is lower compared to liquid fluid. This property allows distinguishing between liquid filled microscopic cavities and dry cavities using sonic and ultrasonic measurements. Example of an ultrasonic device is the USIT (Ultrasonic Imaging Tool) developed by Schlumberger.

Radiographic devices use a radioactive source and a detector. Scattered gamma rays count rate provides information about the cement bond quality. Cavities in the cement reduce the scattered gamma radiation count rate at the detector. Devices of this type are used by many Russian geophysics companies, such as devices Manufactured by Tyumenprogeofizika or NPF Geofizika, models CMTU-1, 2, CM 8-12, SGDT-SV, SGDT-NV, SGDT-100, SGDT SK etc. [1]. These devices use various methods for achieving the azimuthal resolution: a collimator rotating around the nuclear radiation detector or static collimators with multiple detectors installed on its perimeter. Information on casing string and cement bond quality is obtained simultaneously using two sets of detectors arranged one above the other. For example, the SGDT-100 device comprises 12 scintillation detectors for crack and flaw detection: four of them are arranged at 90° azimuthal intervals, and the other 8 scintillation detectors are arranged above the former four detectors at 45° azimuthal intervals and used for cement quality control. An important advantage of these devices is the possibility of simultaneous measurement of the casing integrity and cement bond quality. However, the necessity to use a large number of crystal detectors (with a photomultiplier tube in each detector) makes this equipment expansive and complex. Second, the azimuthal resolution is limited by the number of detectors. Moreover, devices of this type in which NaI crystals are used cannot be operated in hot wells: the normal maximum operation temperature of these devices is about 120° C.

The conventional gas filled detector (a high atomic number noble gas, preferably Xe) has low detection efficiency for high energy gamma radiation (200-400 keV). However, there are two well-known detection efficiency improvement methods. Ionization chambers can be operated at high pressures (30-60 bars); as the gas pressure in an ionization chamber increases, the gas density grows and hence the gamma radiation attenuation coefficient also grows. Proportional chambers provide for higher efficiency, do not require low noise electronic but cannot operate at high gas pressures (as the signal enhancement needs the electric field proportional to the gas pressure). However, the detection efficiency can be increased by using special secondary electron converters for high energy gamma radiation. These converters made from high atomic number materials e.g. Au or Pb are very thin (a few microns). And their total number is large (several hundreds). These thin foil converters increase the detection efficiency at moderate gas pressures (approx. 3-10 bars), and therefore no strong electric fields are required for operating these detectors. These methods were characterized in U.S. Pat. No. 5,521,956 and Russian Patent 2262720. In U.S. Pat. No. 5,521,956, lead foil was suggested for increasing the detection efficiency, whereas Russian Patent 2262720 characterized a system comprising foils of different materials that allow detecting gamma rays of different energies.

A counterpart invention, though not for casing string condition and cement quality control (Russian Patent 2147138), characterized a radiographic large object control method using high energy gamma radiation (E>150 keV). A high pressure gas chamber (1-10 MPa) contains anode and cathode strips arranged one on the other. The gamma rays emitted by a point source pass through the test object and generate signals in each cell of the Xe filled detector array. Secondary electrons generated on the electrode surfaces are accumulated in the same cells. Adequately arranged arrays, high pressure and correct choice of materials provide high detection efficiency (30%). However, a Xe filled detector consisting of multiple cells cannot be used for the angular scanning of pipe shaped articles, but only for the control of flat surfaces with a parallel beam of gamma radiation. This equipment has too large dimensions and cannot be used as a downhole tool.

Another invention (U.S. Pat. No. 4,870,669) characterized a device for nondestructive control comprising a semiconductor detector operating based on the difference gamma radiation spectrum (comparison of a test object gamma spectrum against a defect-free reference gamma spectrum). However, this device is not suitable for downhole operation as the semiconductor detector can only work at low temperatures and the device has large dimensions.

The goal of this invention is to provide a robust universal device with shape and parameters suitable for downhole operation.

SUMMARY OF THE INVENTION

This invention is intended for downhole geophysical inspection, more specifically, provides equipment for flaw detection in casing strings and cement bond quality control using a radiographic device comprising high pressure gas filled gamma detectors. These detectors have high detection efficiency and can be operated at high temperatures.

DETAILED DESCRIPTION OF THE INVENTION

The method of the invention is radiographic. The device of the invention uses a high energy gamma source (a chemical source, e.g. Cs 137 or Co 60, or any other chemical source of gamma rays with an energy of 200-400 keV, or an X-ray tube with the same energy range).

Various embodiments of a gas filled flaw detector are possible. The key criteria are detection mode (ionization or proportional), angular selectivity of gas filled detectors (nonselective single cylinder detectors or highly selective multiple anode/cathode detectors) and the number of objects inspected (1 or 2-3 pipe-shaped articles). Described below are several particular embodiments of this invention with illustrations, but it will be evident to those skilled in the art that numerous embodiments of the flaw detectors can be provided on the basis of the principles stated in this invention. Specific design of the device depends on the requirements imposed on the sensitivity and angular resolution of the device.

As used hereinbelow, the term 'casing string' means any metallic tube lowered into a well wherein the diameter of the tube is greater than the outer dimensions of the flaw detector (e.g. production string).

Embodiment 1

Figure 1:
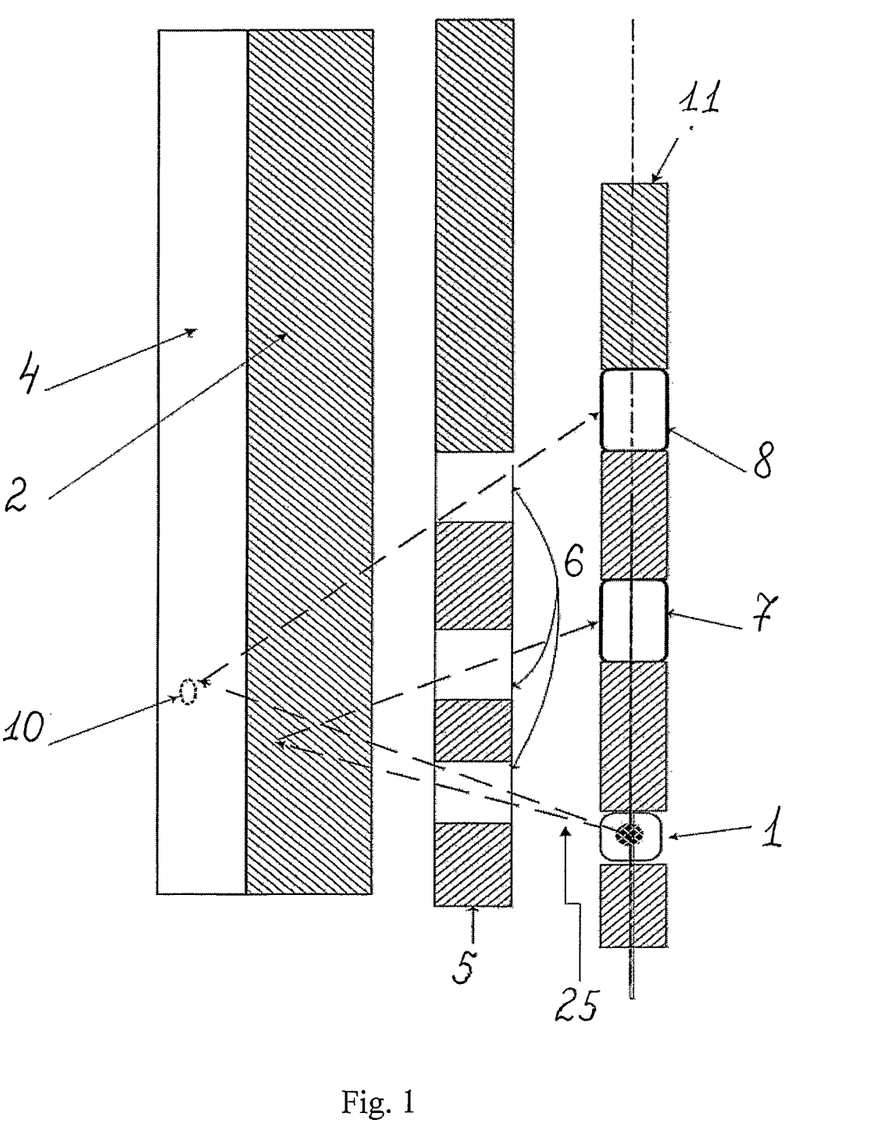
FIG. 1 shows a well flaw detection system in accordance with the present disclosure.

The set of scintillation detectors (to 12 as in known inventions, e.g. SGDT-100) is replaced for two gas filled detectors (operating in ionization or proportional mode). The two independent gas filled detector's are at a certain distance from the radiation source to allow simultaneous casing string condition and cement quality control. Possible design of the device is shown in FIG. 1. Gamma rays 25 are emitted from the gamma source 1 scattered in the casing string 2 or cement 4, pass through the window 6 of the collimator 5 and are incident upon the detectors 7 and 8 which are coaxial with the gamma source 1. The detectors 7 and 8 are separated by the collimator 11. If the background gamma radiation scattered outside the casing string is low enough (this can be achieved by correctly choosing the collimator shape), the total count rate of the detector 7 gives information on the casing string thickness. The smaller the effective thickness of the string (if the string has a cavity or a crack), the lower the total count rate of the respective detector. The count rate of the detector 8 show the effective thickness of the bonding cement layer. If the readings of the detector 7 do not show any flaws in the string 2, then a higher count rate of the detector 8 indicates poor quality of the bonding cement 4.

Embodiment 2

Figure 2:
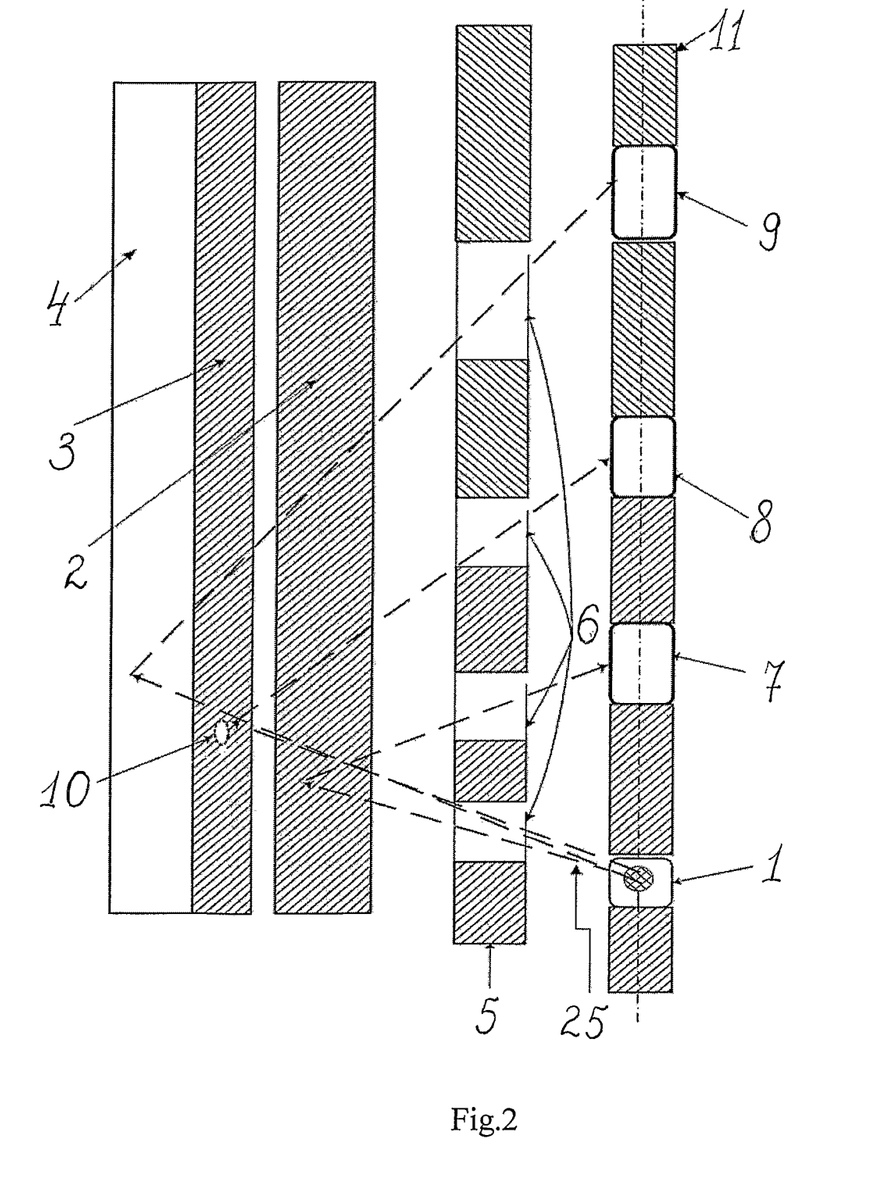
FIG. 2 shows another configuration of a well flaw detection system in accordance with the present disclosure.

The number of the detectors can be increased if the task is to obtain further information, e.g. providing the nondestructive control of wells with multiple casing strings. The device operation principle is the same as described above. The design of the device is shown in FIG. 2. The device comprises a gamma source 1, three detectors 7-9, the window 6 of a collimator 5, the collimator 11 for the detectors, two casing strings 2 and 3 and bonding cement 4. In this embodiment the detectors 7 and 8 detect gamma radiation scattered in the casing strings 2 and 3, respectively, and the detector 9 detects gamma radiation scattered in the bonding cement 4. The device performance is limited primarily by gamma radiation attenuation in the casing strings and in the bonding cement, therefore to control cement quality one should either increase the exposure or replace the gamma source (by either increasing the radiation intensity or using gamma source with higher gamma rays energy, e.g. replacing Cs 137 for Co 60 as an example).

The gamma source can be a mixture of gamma active long-lived isotopes. Then the device may comprise detectors operating in ionization mode as shown in FIG. 2. The high energy resolution of these detectors allows resolving close gamma ray energy levels. The resolution provided by higher energy gamma rays is preferable for greater depths, and lower energy gamma rays are preferable for scanning the closest steel tube.

It is suggested to increase the detection efficiency of the device by one of the following well-known methods: the detector is filled with an inert gas (preferably xenon) at a high pressure (several decades of bars) or additional metallic converters are installed in the working space (this provides for gamma ray conversion into secondary electrons that are detected). The combination of the latter two methods provides for optimum detection. An advantage of this detector over conventional gas filled detectors is that the count rates of this detector may depend on the angular coordinate. The distance between the anodes (the spatial resolution) is from a few millimeters (for proportional mode) up to few centimeters (for ionization mode).

Unlike conventional scintillation detectors, the parameters of gas filled detectors are not temperature sensitive (if low noise logic is used). The possibility of operating these detectors at high temperatures (approx. 200° C.) allows cement quality control in very deep wells. The designs described below provide for a higher spatial resolution compared to scintillation detectors. Devices with gas filled detectors are cheaper because Xe is less expensive than most of crystals.

High atomic number noble gases are used in gas filled detectors such as Ar, Kr, Xe (Xe is preferable due to its highest atomic number and hence lowest attenuation coefficient) or mixtures of these gases with special additions. In proportional detectors, noble gases are modified with polyatomic quenchers such as $CO_2$ and $CH_4$ for absorbing the photons generated in the electron avalanche and suppressing secondary emission from the cathodes. The detection efficiency of ionization detectors can be increased by electron drift accelerating additions such as hydrogen.

Embodiment 3

Ionization operation mode is suggested as a preferred embodiment of a gamma ray flaw detector with high pressure gas filled detectors. Operation in this mode requires high density (pressure) media with low near-electrode electric field strength not generating avalanche.

Figure 3:
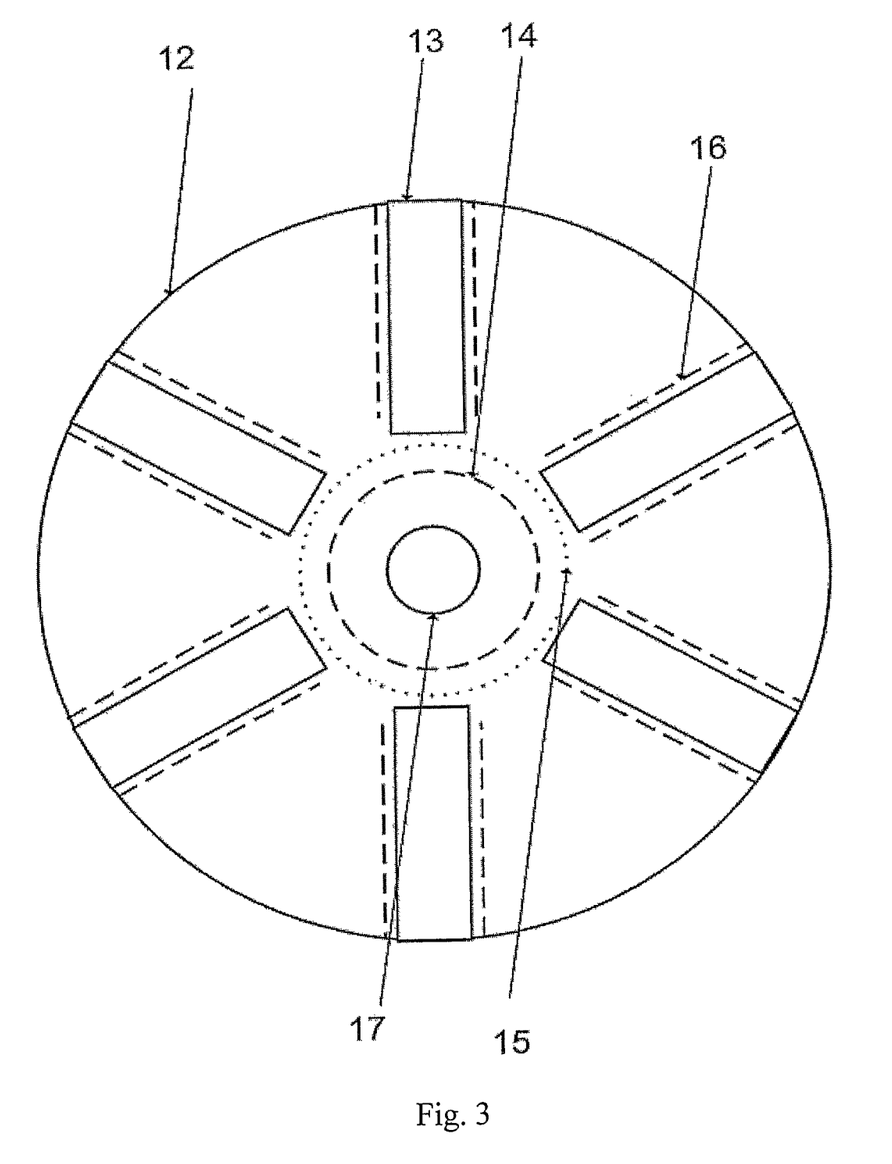
FIG. 3 shows an ionization chamber for use in the well flaw detection systems described herein.

The high pressure (30-60 bars) Xe filled ionization chamber can be used for flaw detection in the casing string or the bonding cement. High detection efficiency requires high gas pressure which is nearly proportional to gas density. The efficiency of an ionization chamber can be increased by using a Frisch grid; alternatively, only the electron component of the total signal can be used. Possible ionization chamber design is shown in FIG. 3 (plan view). It comprises a light metal cathode 12. For low energy gamma radiation, aluminum or beryllium alloys can be used, whereas for higher energy gamma rays (E>100 keV), stainless steel or a combination of a metal and a nonconductive material with a low attenuation coefficient (fiberglass, fibercarbon, $B_4C$, Kevlar) is suitable. The detector comprises two collimators 13 made from a highly absorbing material (lead, tungsten tantalum etc.) and wire anodes (segmented metallic anode) 14. Frisch grid 15 can be used to increase the detector performance making the signal sensitive to the electrons between the Frisch grid and the anode only. Special electrodes 16 smooth the electric field around the lead collimators. The core 17 has a cylindrical shape and is made from a highly absorbing material. The core avoids spurious gamma signals detection in improper device sections.

A gamma quantum entering a single segment between the collimators generates an electron/ion pair. The electrons are transferred by the electric field to the anode segments (vertical wires or strips) and generate a signal due to a defect in this segment.

The length of these detectors may be from 10 to 50 cm, and the diameter from 3 to 19 cm, therefore these detectors can be used in downhole tubes. The number of segments (collimators and wire anodes for signal separation) may differ from the one shown in the figure; this depends on the tube condition control angular resolution requirements.

Embodiment 4

Another embodiment of the invention is possible (FIG. 4) wherein the detector is operated in ionization mode. Unlike the previous embodiment, independent high pressure Xe filled cylindrical detectors are used here. These cylindrical detectors themselves do not provide for the angular resolution of the gamma flux (there is one signal from one anode), and their components can be commercially available Xe filled gamma detectors. The case 19 (from a strong low absorbing material) of the device accommodates a set of independent Xe filled cylindrical detectors installed between lead collimators 18. Each detector comprises a cathode 12 (it can be made from a light material, e.g. aluminum or beryllium alloy, or from steel if low energy gamma rays can be ignored), a Frisch grid 15 and a wire anode 14. This design has a lower total sensitivity (small radius of the cylinders) and lower efficiency. However, this design is more robust as all the detectors are independent from each other and have a symmetrical electric field. If any of the detectors fails the remaining ones can still be used for the measurements.

Figure 4:
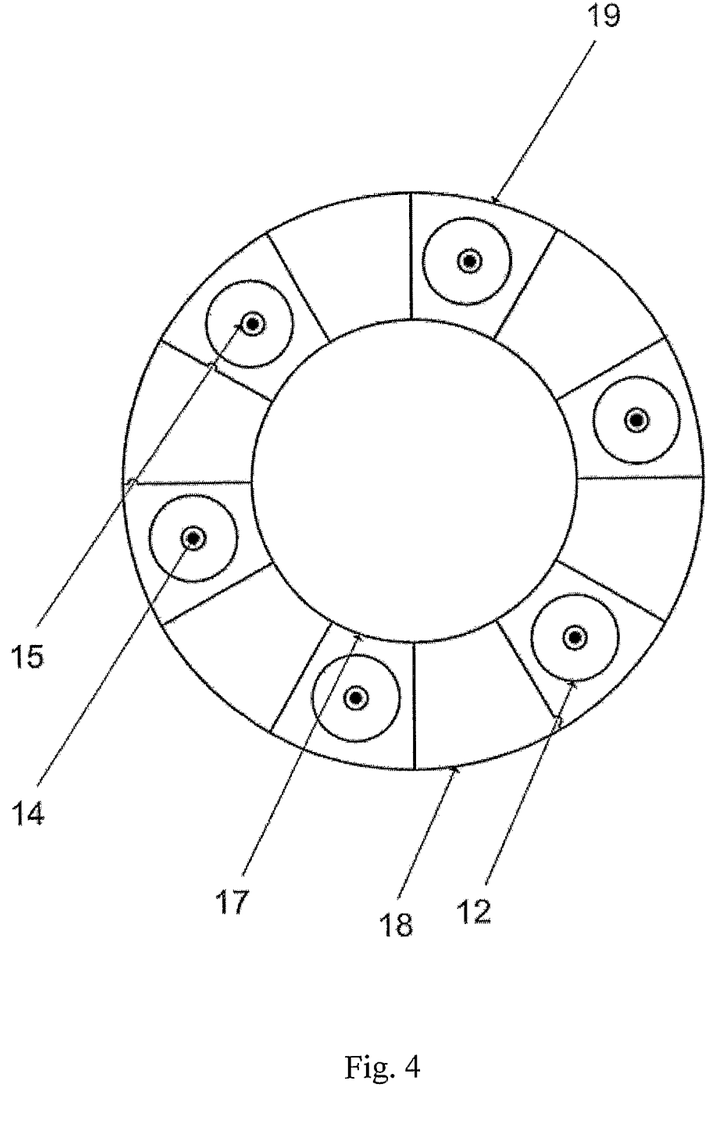
FIG. 4 shows another configuration of ionization chamber for use in the well flaw detection systems described herein.

Whereas conventional crystal (NaI) detectors have crystal height limitation (growing a large and perfect crystal is a technical problem), cylindrical high pressure gas filled detectors (Xe, 30-60 bars) have no cylinder height limitations. This increases the sensitive area and provides for the same sensitivity as in earlier radiographic systems. The thickness of the collimators allows the detection of scattered gamma radiation within the same angle as in a single gas filled detector.

Unlike a proportional chamber (to be described below), signal processing with an ionization chamber requires low noise logic; this may prove to be very useful because low noise logic simultaneously provides for high detection efficiency and high energy resolution (2% for the Cs 137 peak). This can be used for resolving close energy levels in the gamma spectrum. Then a multiple energy level gamma source or a multiple isotope source can be used (e.g. Cs 137 with the 662 keV energy level and Co 60 with the two peaks at 1173 and 1332 keV). Due to the difference in the gamma ray absorption coefficients at different energies, high energy gamma rays will provide for a higher sensitivity at greater depths than low energy gamma rays.

Embodiment 5

A proportional chamber can be operated at moderate pressure (3-10 bars) and moderate electric fields (<10-20 kV/cm). The detector is so designed that the entering radiation is incident upon the converters (high atomic number material foils). There the gamma rays are converted to secondary electrons. The electrons drift to the chamber containing multiple wires (the anode/cathode system) which generates new electrons (electron avalanche) that also drift to the wire anodes. This multi-wire chamber contains cathode and anode planes (typically spaced by a few millimeters). The cathode should be transparent for the electrons entering the cathode/anode space where the electric field is strong (2-20 kV/cm) and the avalanche-generated electrons drift to the wire anodes. The converters may have various shapes (cylinders, strips etc.).

Figure 5:
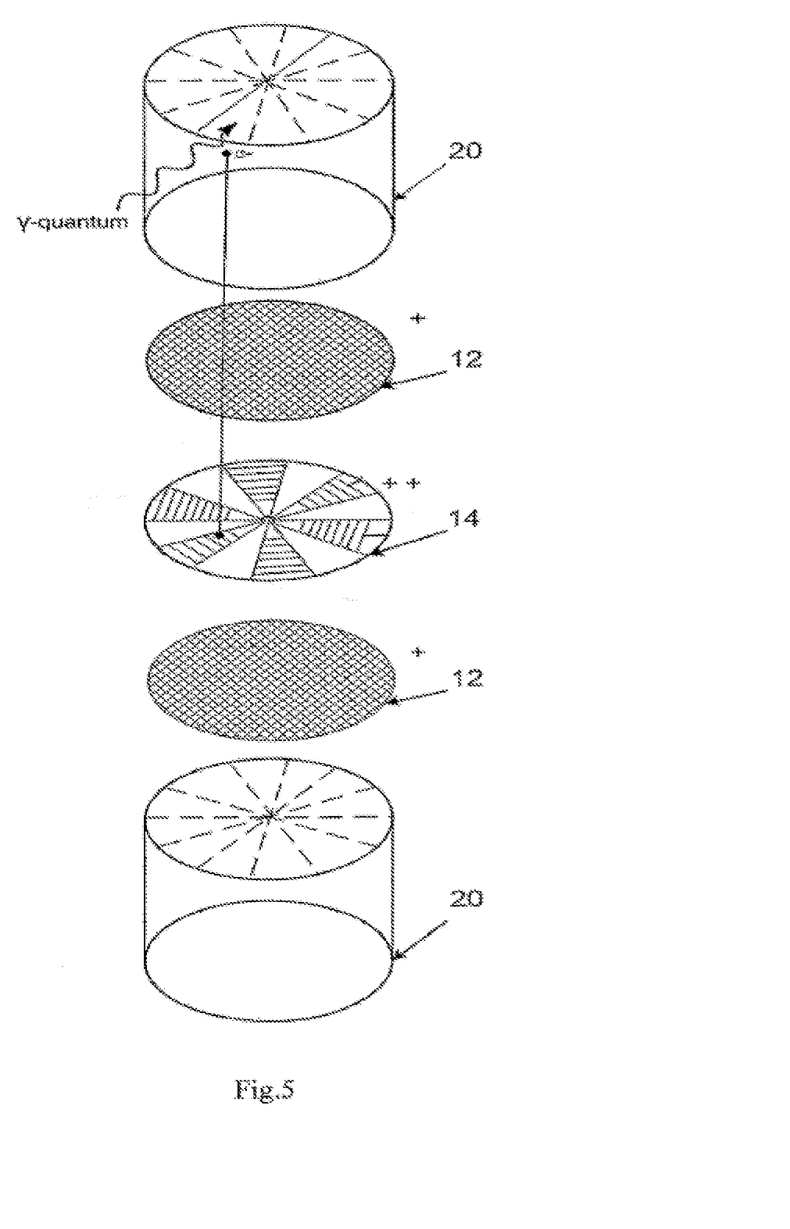
FIG. 5 shows yet another configuration of ionization chamber for use in the well flaw detection systems described herein.
Figure 6:
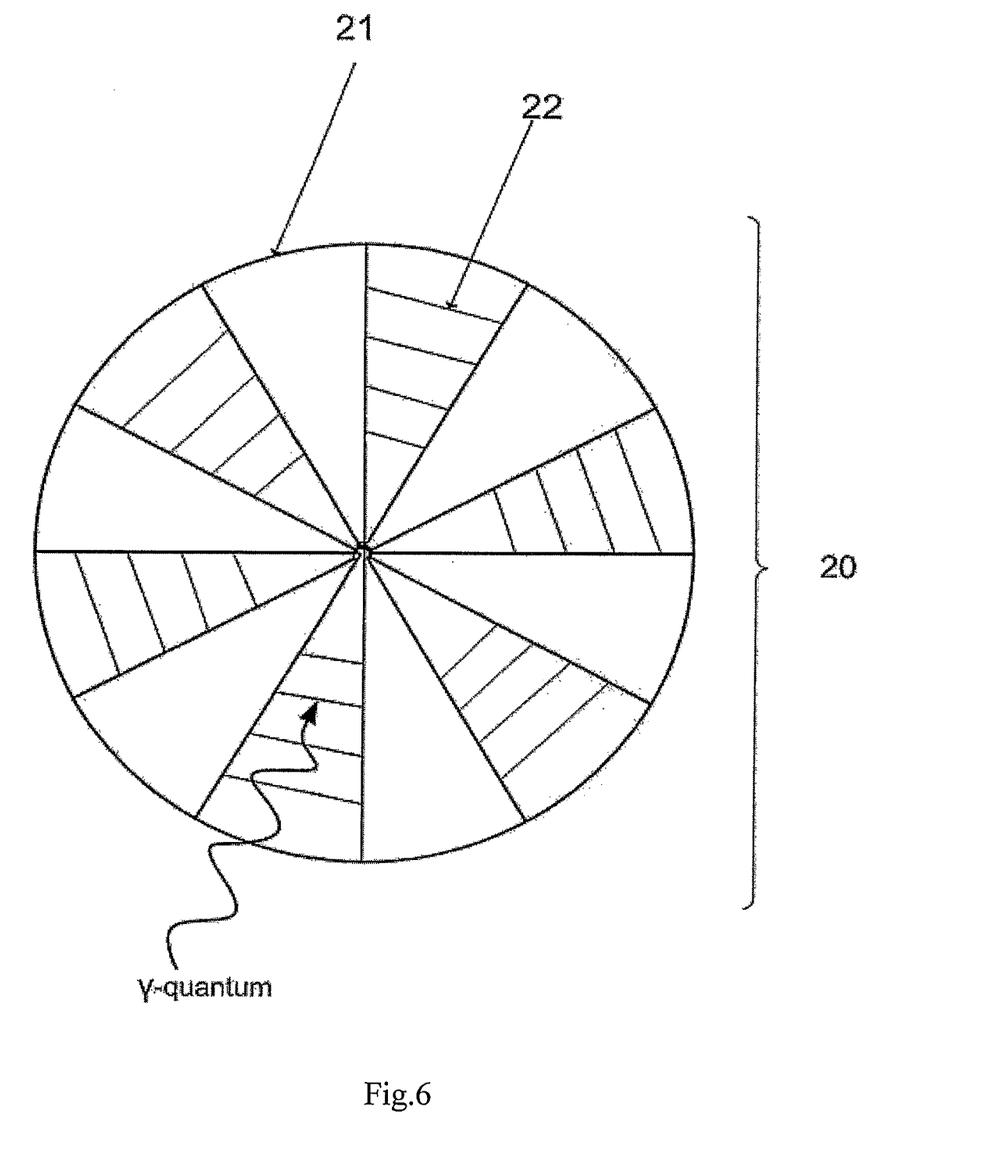
FIG. 6 shows a gamma ray absorbing converter for use in the well flaw detections systems described herein.

The system described here may have different embodiments one of which is illustrated in FIG. 5. Gamma rays transmitted through the case wall enter one of the special hybrid absorbing converters 20 (their possible design is illustrated in FIG. 6) to generate electrons that are driven by the (moderate strength) electric field to the cathode/anode system between the converter units and the cathode system. The electrons are then heavily accelerated in the cathode/anode space by a strong electric field. The cathode 12 may have a grid design or any other design making it electron transparent. The number of anode wires can be large enough because the distance between them is a few millimeters.

Details of the special hybrid filler and the absorbers 20 are shown in FIG. 6. The absorbing element 20 comprises multiple absorbers 22 (made from lead or another high atomic number material) that split the top and bottom element 20 into several gamma sensitive segments filled with thin foils 22 located one on another the shapes of which are similar to those of the anode lobes 14 located in the middle of the detector. The top and bottom elements 20 are unbiased or negatively biased. As these foils (few micrometers in thickness) are made from heavy metals (e.g. lead or tantalum), the incident gamma rays knock several secondary electrons from the primary electrode. These electrons are driven by the low strength electric field to the electron transparent grid cathode 12 under a moderate positive bias and then rapidly accelerated to the anode lobes (the anode may be made from multiple wires) under a high positive bias. Only those gamma rays that are transmitted from the outside to the selected segment between the two absorbers 21 can be detected as electric signals in the wires of the respective anode lobe 14. This provides for high angular resolution of the gas filled detector and high sensitivity due to ionization. The number of segments can be greater than shown in the Figure.

This design provides for a higher spatial resolution compared to conventional scanning devices (different models of SGDT or CM devices) comprising 6-8 scintillation detectors. The number of segments is only limited by the gamma radiation permeability of the absorbing segments.

EXAMPLE

Figure 7:
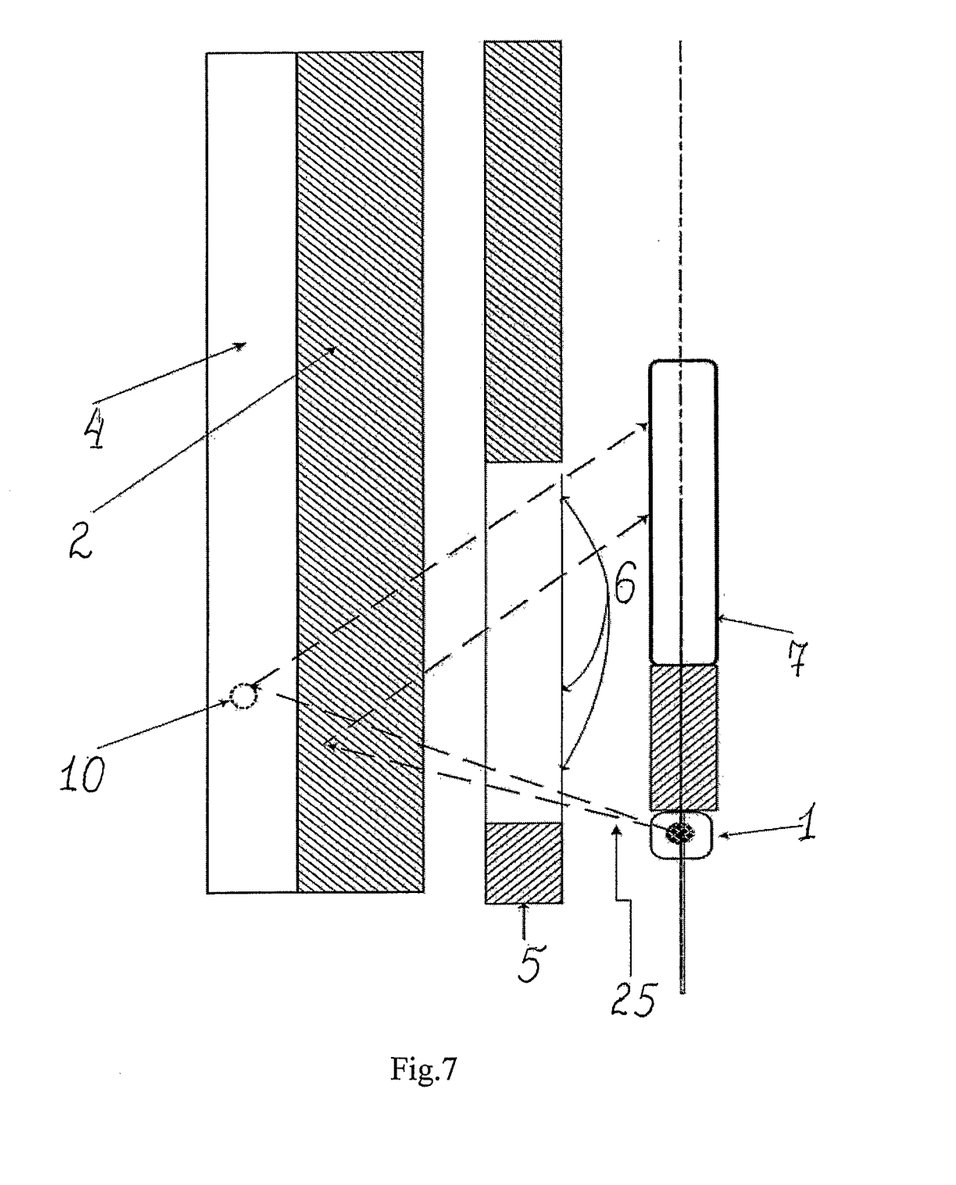
FIG. 7 shows a well flaw detection system utilizing a gas filled radiation detector in accordance with the present disclosure.

The example below illustrates the technical possibility to provide a device based on a gas filled detector. A multi-wire proportional chamber was not designed to provide azimuthal resolution or to be operated at high pressures without converters. The design of this device is shown in FIG. 7.

In this design, one multi-wire detector 7 (the wires are oriented orthogonally to the main detector axis) detects gamma rays emitted by the source 1 and scattered in the casing string 2 or in the bonding cement 4. The anode to cathode distance in the detector is 1 mm, and the anode to pulling electrode distance is 11 mm. The detector is 38 cm long and 5.0 cm wide. The anode-cathode voltage is 2.1 kV, and the anode-pulling electrode voltage is 6.55 kV. The xenon pressure in the detector chamber is 3 bars.

A cavity in the bonding cement was simulated with a 1 cm diameter opening in the aluminum plate 4, and the casing string was simulated with a steel plate having a cross-section of 2 cm×0.5 cm (thinner than commercial casing strings). This experimental setup allowed the laboratory tests to be held in a proportional chamber at relatively low pressures without efficiency increasing converters using a low activity radioactive source, 2 GBq. Usually, the radioactive source activity for commercial flaw detectors is at least 60 GBq. The total count rate after flaw zone entering changed from $0.67 \times 10^6$ counts to $0.65 \times 10^6$ counts making flaw detection in an aluminum plate statistically valid.

NON-PATENT REFERENCES

1. E. V. Semenov, T. E. Krutova, R. R. Galeev, A. M. Islamov, Gamma-gamma scanners for the cased wells investigation, Karotazhnik, Vol. 10-11, pp. 66-73, 2005.

What is claimed is a:

1. A casing string well inspection system comprising:
   a radioactive source that emits gamma rays having an energy range of 200 to 400 keV and comprising a mixture of gamma active long-lived isotopes;
   at least two detectors installed coaxially with the radioactive source, at least one of the detectors having an ionization mode and comprising an ionization chamber having a cathode made from a light metal or a combination of light metal and a nonconductive material having a low attenuation coefficient, the ionization chamber comprising at least two collimators made from a high absorption coefficient material and wire anodes, the at least two collimators, cathode, and wire anode surrounding a cylinder shaped core electrode made from a high absorption coefficient material;
   a first collimator positioned between the radioactive source and a wall of the casing string, the casing string bonded to the well with a cement layer; and
   a second collimator installed axially between the detectors and the radioactive source, wherein the detectors are gas filled gamma detectors.

2. The system of claim 1 wherein gas filled gamma detectors are pressurized from between 30 bars to 60 bars.

3. The system of claim 2 wherein the radioactive source comprises an X-ray tube.

4. The system of claim 1 wherein the first collimator comprises windows that are arranged such that gamma rays emitted from the radioactive source pass through the casing string and/or cement layer and gamma rays scattered by the casing string and/or cement layer are incident upon the detectors.

5. The system of claim 1 further comprising:
   a third detector installed coaxially with the radioactive source and the first and second detectors, wherein the second collimator is installed between each of the detectors and radioactive source.

6. The system of claim 1 wherein at least one of the detectors is filled with a high pressure inert gas.

7. The system of claim 1 wherein at least one of the detectors comprises a working space that contains additional metallic converters to provide for conversion of gamma rays to secondary electrons.

8. The system of claim 1 wherein the detectors further contain a Frisch grid.

9. The system of claim 1 wherein at least one of the detectors comprises a case made from a strong low absorption coefficient material, the case further comprising:
   at least two independent Xe filled cylindrical electrodes installed between collimators made from lead, wherein each of the cylindrical electrodes comprises a cathode surrounding a Frisch grid, and a wire anode surrounded by the Frisch grid.

10. The system of claim 9 wherein the radioactive source comprises a multiple energy level gamma source or a multiple isotope source.

11. A casing string well inspection system comprising:
    a radioactive source that emits gamma rays having an energy range of 200 to 400 keV;
    at least two detectors installed coaxially with the radioactive source;
    at least one of the detectors comprising a case made from a strong low absorption coefficient material, the case comprising at least two independent Xe filled cylindrical electrodes installed between collimators made from lead, each of the cylindrical electrodes comprises a cathode surrounding, a Frisch grid, and a wire anode surrounded by the Frisch grid;
    a first collimator positioned between the radioactive source and a wall of the casing string, the casing string bonded to the well with a cement layer; and
    a second collimator installed axially between the detectors and the radioactive source, wherein the detectors are gas filled gamma detectors.

12. The system of claim 11 the radioactive source comprises a multiple energy level gamma source or a multiple isotope source.

* * * * *